(12) United States Patent
Bae et al.

(10) Patent No.: US 10,895,866 B1
(45) Date of Patent: Jan. 19, 2021

(54) POSITION ERROR CORRECTION FOR ELECTRIC MOTORS

(71) Applicants: Bon Ho Bae, Cupertino, CA (US); Jihoon Jang, Santa Clara, CA (US)

(72) Inventors: Bon Ho Bae, Cupertino, CA (US); Jihoon Jang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 16/290,007

(22) Filed: Mar. 1, 2019

Related U.S. Application Data

(60) Provisional application No. 62/640,159, filed on Mar. 8, 2018.

(51) Int. Cl.
*G05B 19/406* (2006.01)
*G05B 19/4155* (2006.01)
*H02K 24/00* (2006.01)

(52) U.S. Cl.
CPC ....... *G05B 19/4155* (2013.01); *G05B 19/406* (2013.01); *H02K 24/00* (2013.01); *G05B 2219/37473* (2013.01)

(58) Field of Classification Search
CPC ..... H02P 6/16; H02P 23/0077; G05B 19/404; G05B 19/4083; G05B 19/406; G05B 19/416
See application file for complete search history.

(56) References Cited

U.S. PATENT DOCUMENTS

| | | | |
|---|---|---|---|
| 4,533,902 A | 8/1985 | Baker et al. | |
| 6,556,153 B1 | 4/2003 | Cardamone | |
| 6,707,265 B2 | 3/2004 | Imai et al. | |
| 7,208,902 B2* | 4/2007 | Yamane | B41J 11/42 318/461 |
| 7,633,256 B2* | 12/2009 | Reichert | G02B 26/122 318/602 |
| 7,915,849 B2* | 3/2011 | Berkey | G05B 19/4062 318/602 |
| 7,999,496 B2 | 8/2011 | Gleason et al. | |
| 8,072,176 B2* | 12/2011 | Ueda | G01D 3/02 318/671 |
| 9,071,176 B2* | 6/2015 | Gu | H02P 29/0016 |
| 2004/0164733 A1 | 8/2004 | Fukaya et al. | |
| 2005/0110452 A1 | 5/2005 | Toyozawa et al. | |
| 2008/0061723 A1* | 3/2008 | Fujita | G05D 13/62 318/560 |
| 2008/0272731 A1 | 11/2008 | Schulz et al. | |

(Continued)

*Primary Examiner* — Thai T Dinh
(74) *Attorney, Agent, or Firm* — Young Basile Hanlon & MacFarlane, P.C.

(57) ABSTRACT

Position and speed correction are applied to observed values from a position sensor in order to operate an electric motor. Observed position values and observed speed values are obtained from the position sensor for time points during a sampling window, ideal position values and ideal speed values are determined for each of the time points, and position and speed error values are determined based on the observed and ideal values. Stored position information is updated using the position error values and the speed error values. The electric motor is operated using corrected position values and corrected speed values that are determined from the observed position values, the observed speed values, and the stored position information.

20 Claims, 8 Drawing Sheets

(56) References Cited

U.S. PATENT DOCUMENTS

| | | |
|---|---|---|
| 2009/0015188 A1* | 1/2009 | Sasaki .................. H02P 6/10 318/632 |
| 2010/0295491 A1 | 11/2010 | Schulz et al. |
| 2010/0321008 A1 | 12/2010 | Mita et al. |
| 2011/0202308 A1 | 8/2011 | Kishida et al. |
| 2011/0260663 A1* | 10/2011 | Jeon .................. B60L 50/50 318/400.04 |
| 2013/0093375 A1 | 4/2013 | Cao et al. |
| 2013/0193276 A1 | 8/2013 | Hunter |
| 2014/0145660 A1 | 5/2014 | Shimada et al. |
| 2014/0258580 A1* | 9/2014 | Suzuki .............. H02P 23/0077 710/261 |
| 2014/0336878 A1 | 11/2014 | Yanai et al. |
| 2015/0212511 A1* | 7/2015 | Furutani .............. H02P 6/16 318/632 |
| 2017/0151875 A1 | 6/2017 | Campbell et al. |
| 2018/0022386 A1 | 1/2018 | Watanabe et al. |

* cited by examiner

POSITION ERROR CORRECTION FOR ELECTRIC MOTORS

CROSS-REFERENCE TO RELATED APPLICATION(S)

This application claims the benefit of U.S. Provisional Application No. 62/640,159, filed on Mar. 8, 2018. The content of the foregoing application is incorporated herein by reference in its entirety for all purposes.

TECHNICAL FIELD

The application relates generally to the field of electric motor position detection.

BACKGROUND

According to common designs, electric motors include a rotor and a stator. The stator is a fixed structure and may, for example, be connected to a motor housing such that it does not move relative to the motor housing. The rotor is the moving part of the electric motor, and may be mounted so that it is able to rotate relative to the motor housing. For example, the rotor may include a shaft that is supported relative to the motor housing by bearings. The rotor and the stator include magnetic and electromagnetic components that interact to cause rotation of the rotor with respect to the stator. For example, electromagnetic windings that are supported by the stator, such as in stator slots, and may be selectively energized to cause motion of magnetic portions of the rotor into magnetic alignment with the stator. By varying the manner in which the stator is energized, motion is imparted to the rotor. Some electric motors, such as three-phase alternating current motors, may utilize a position sensor to control the timing of energization of the electromagnetic windings of the stator. The position sensor measures and reports a position (e.g., an angular position) of the rotor relative to the stator.

SUMMARY

One aspect of the disclosure is an apparatus that includes a position sensor that outputs observed position values and observed speed values for time points during a sampling window, an electric motor that is connected to the position sensor, and a position corrector. The position corrector is operable to determine ideal position values and ideal speed values for each of the time points, determine position error values for each of the time points based on the observed position values and the ideal position values, determine speed error values for each of the time points based on the observed speed values and the ideal speed values, update stored position information using the position error values and the speed error values, and operate the electric motor using corrected position values and corrected speed values that are determined from the observed position values, the observed speed values, and the stored position information.

Another aspect of the disclosure is a method that includes obtaining observed position values and observed speed values from a position sensor for time points during a sampling window; determining ideal position values and ideal speed values for each of the time points; determining position error values for each of the time points based on the observed position values and the ideal position values; determining speed error values for each of the time points based on the observed speed values and the ideal speed values; updating stored position information using the position error values and the speed error values; and operating an electric motor using corrected position values and corrected speed values that are determined from the observed position values, the observed speed values, and the stored position information.

Another aspect of the disclosure is a system that includes a computing device having computer-executable instructions. When executed, the computer-executable instructions cause the computing device to obtain observed position values and observed speed values from a position sensor for time points during a sampling window, determine ideal position values and ideal speed values for each of the time points, determine position error values for each of the time points based on the observed position values and the ideal position values, determine speed error values for each of the time points based on the observed speed values and the ideal speed values, update stored position information using the position error values and the speed error values, and operate an electric motor using corrected position values and corrected speed values that are determined from the observed position values, the observed speed values, and the stored position information.

DETAILED DESCRIPTION

The position reported by a position sensor for an electric motor may deviate from an actual position by an error. As an example, one source of position error may be misalignment of the position sensor relative to the stator of the electric motor during assembly. The disclosure herein is directed to systems and methods that monitor the position signal that is output by a position sensor and adjust the position signal to correct for the error in it. The corrected position signal is then used to operate the electric motor, such as by determining timing for energization and de-energization of the windings of the electric motor.

The systems and methods described herein avoid determining periodic position errors based on speed, which can require that the speed information be provided with high bandwidth and high accuracy by methods that consume significant resources (e.g., bandwidth, code size, etc.). Instead, the systems and methods described herein use position values and time values. The speed information may also be used but speed dynamics are not necessary because the speed is used to calculate the tendency of the speed change. In addition, the time value is available from the digital timer that resides in the microprocessor. In total, the systems and methods that are described herein utilize much less throughput and code size. In addition, the systems and methods described herein accommodate use cases in which the speed is constant and use cases in which the speed is changing linearly.

Figure 1:
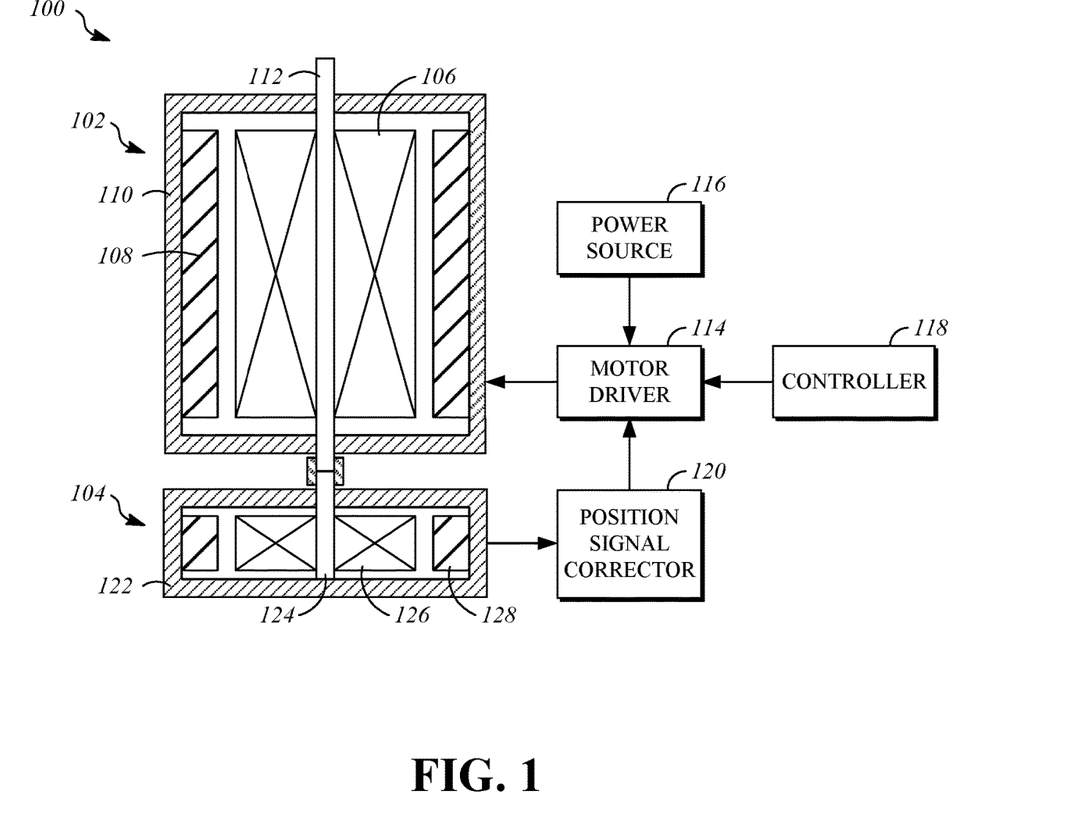
FIG. 1 is a block diagram that shows a mapping system and a group of distributed devices.

FIG. 1 is an illustration that shows an assembly 100 that includes an electric motor 102 and a position sensor such as a resolver 104. In the illustrated example, the resolver 104 is depicted as being connected to the electric motor 102. In alternative implementations, the resolver 104 could be integrated into the electric motor 102.

The electric motor 102 is an example of a structural configuration for an electric motor that can be utilized in implementing the apparatuses, systems and methods described herein. Configurations other than that illustrated for the electric motor 102 can be utilized. In the illustrated example, the electric motor 102 includes a rotor 106, a stator 108, and a motor housing 110. The rotor 106 is supported relative to the motor housing 110 by a motor shaft 112 in a manner that allows rotation of the rotor 106 relative to the motor housing 110 and the stator 108. For example, the motor shaft 112 may be supported with respect to the motor housing 110 by bearings.

To cause rotation of the stator 108 and the motor shaft 112, magnetic elements are formed on one of the rotor 106 or the stator 108, and electromagnetic elements are formed on the other one of the rotor 106 or the stator 108. As an example, phase windings may be located in slots that are formed on the stator 108 and arranged in sets that correspond to electrical phases (e.g., three phases). The phase windings are electrically connected to a motor driver 114 that provides an output signal (e.g., a three-phase signal) that energizes and de-energizes the phase windings to cause rotation of stator 108 and the motor shaft 112 of the electric motor 102. The motor driver 114 receives electrical power from a power source 116 and operates in accordance with inputs that are received from a controller 118. The controller 118 may dictate, for example, a rotational speed or a torque to be achieved by the motor driver 114. The motor driver 114 also uses information from a position signal corrector 120 to generate the output signal in dependence upon the position of the rotor 106 relative to the stator 108.

The resolver 104 is an example of a position sensor that is operable to output a position signal that describes an absolute position of the rotor 106 relative to the stator 108 and/or to the motor housing 110. Examples of other devices that can be as position sensors in place of the resolver 104 include optical encoders, capacitive encoders, and Hall-effect devices. One example of a structural configuration for the resolver 104 includes a sensor housing 122, a sensor shaft 124, first sensor components 126 that are coupled to the sensor shaft 124, and second sensor components 128 that are connected to the sensor housing 122. The sensor shaft 124 is connected to the motor shaft 112 so that the sensor shaft 124 rotates in unison with the motor shaft 112. As one example, the sensor shaft 124 may be connected to the motor shaft 112 by a fastener such as a sleeve coupler. As another example, the sensor shaft 124 may be connected to the motor shaft 112 by a joining method such as welding. As another example, the sensor shaft 124 and the motor shaft 112 may be formed integrally (i.e., the motor shaft 112 and the sensor shaft 124 are portions of a single shaft).

To generate the position signal, the first sensor components 126 are coupled to the sensor shaft 124 and the second sensor components 128 are connected to the sensor housing 122. For example, the position signal may be using a varying electrical characteristic, such as inductance, that is measurable by the second sensor components 128 in response to rotation of the first sensor components 126. In the case of the resolver 104 and certain other position sensors, the position signal is converted from an analog signal to a digital signal to allow use of the signal by other devices, such as microcontrollers. Therefore, the resolver 104 can include or be connected to a Resolver-to-Digital Converter (RDC) that receives an analog signal from the resolver and outputs the position signal as a digital signal.

Position sensors, such as the resolver 104, have periodic errors may be attributable to the design of the sensor itself, errors in electric circuits incorporated in the position sensor and/or imperfect mounting. Some position errors are periodic harmonics having a frequency that is equal to the mechanical rotation or the frequency of position sensor. The description herein will be made using a resolver, such as the resolver 104, as an example of a position sensor. The frequency of the resolver is equal to the number of pole-pairs of the resolver times the mechanical frequency of the rotation of the electric motor (e.g., the electric motor 102) that the resolver is connected to. The relationship between the frequency of mechanical rotation $f_{mech}$ and the frequency of resolver period $f_{res}$ is given by Equation 1, in which $pp_{res}$ is equal to the number of pole-pairs that are included in the resolver.

$$f_{res} = pp_{res} \times f_{mech} \qquad \text{(Equation 1)}$$

Figure 2:
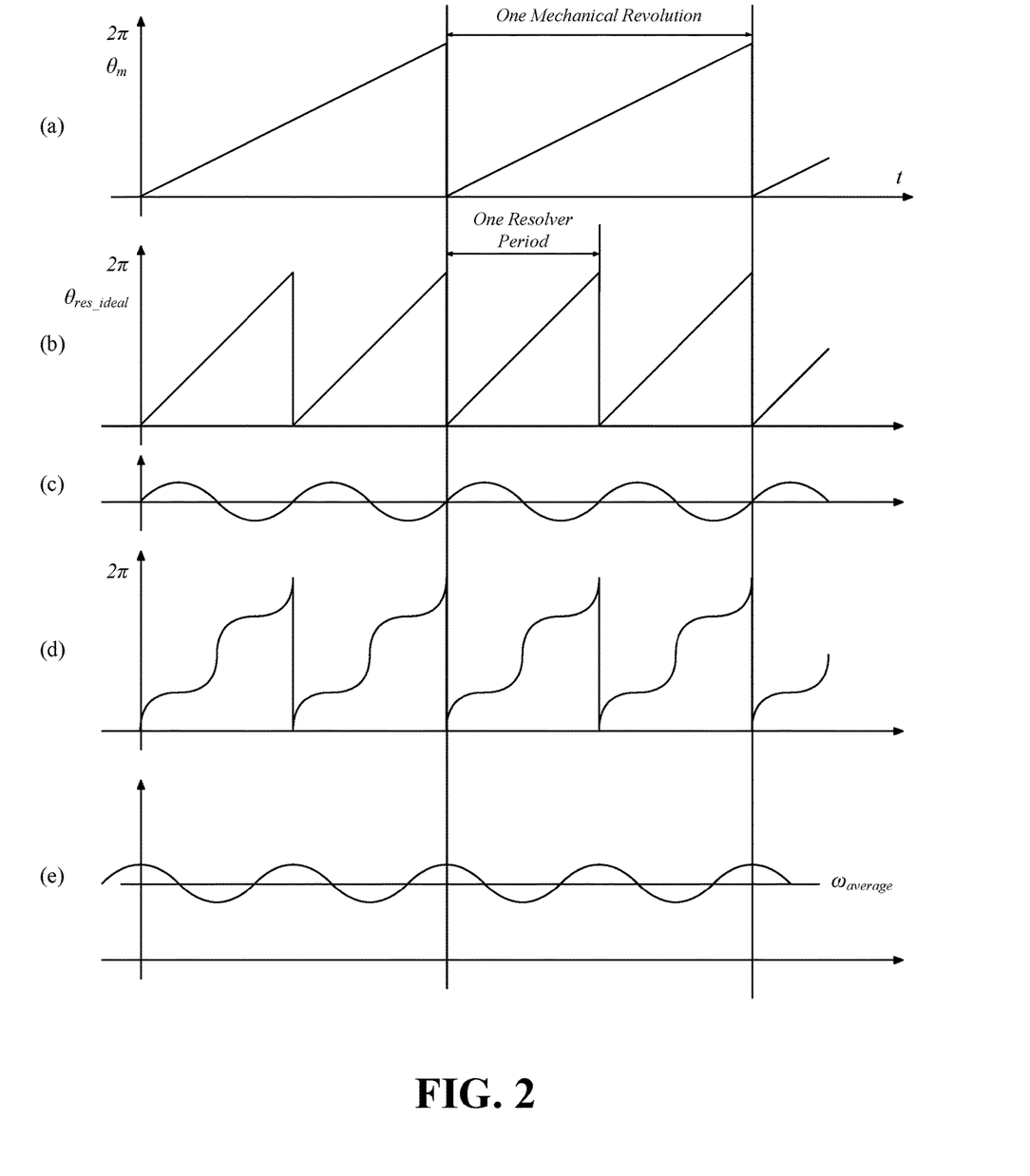
FIG. 2 is a graph that shows an example of a position signal with periodic error.

FIG. 2 is a graph that shows an example of a position signal with periodic error. The position signal shown in FIG. 2 may be output by a resolver, such as the resolver 104. Part (a) shows a mechanical rotor position $\theta_m$ of an electric motor in radians, part (b) shows an ideal output $\theta_{res\_ideal}$ (in radians) of a position sensor with two pole-pairs, part (c) shows an example of periodic position error, part (d) shows a position signal output by the position sensor including periodic error (in radians), and part (e) shows a speed calculated from output of the position sensor with periodic error and the corresponding average speed $\omega_{avg}$.

In this example, the position sensor has two pole-pairs and therefore there are two cycles of resolver position in one mechanical period (i.e., one rotation of the motor), and the position error is assumed be to periodic to the resolver frequency. For purposes of illustration, the position error shown in the illustrated example is unrealistically large (~45° in resolver position). If the rotor position and speed for the motor current control have the periodic errors, the performance of current control degrades and the motor current can have oscillation and offset. This non-ideal current waveform can produce torque disturbances and unnecessary losses.

Figure 3:
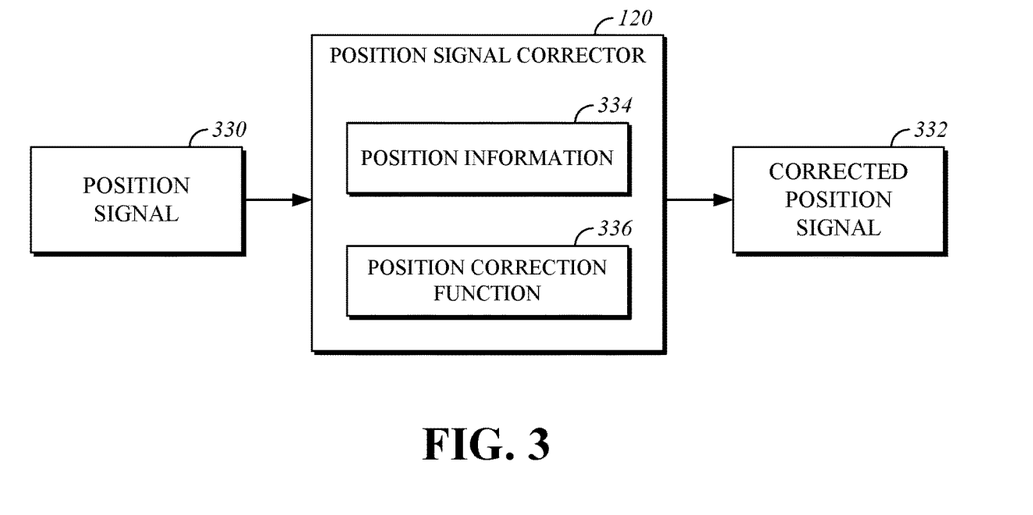
FIG. 3 is a block diagram that shows a position signal corrector.

FIG. 3 is a block diagram that shows the position signal corrector 120. The position signal corrector 120 captures the periodic error from the position sensor and compensates for the periodic error to estimate the position and speed of the electric motor 102 without the error.

As one example, the position signal corrector 120 may be implemented in the form of computer executable instructions that are executed by a computing device that has a memory and a processor. As another example, the position signal corrector 120 may be implemented in the form of special purpose hardware, such as an Application-Specific Integrated Circuit (ASIC) or a Field Programmable Gate Array (FPGA).

The position signal corrector 120 receives a position signal 330 as an input. The position signal 330 is received, for example, from the resolver 104 of the assembly 100. The position signal corrector 120 determines and outputs a corrected position signal 332 by sampling the position signal 330 overtime and estimating the periodic error of the position signal 330 as a function of the position of the rotor 106 relative to the stator 108. In particular, in the illustrated implementation, the position signal corrector 120 may accumulate stored position information 334 and determine a position correction function 336 that is used to determine the corrected position signal 332 based on the position signal 330.

The stored position information 334 includes three components: position output, speed output, and timer output, which are sampled once for each predefined step size of the resolver position. As an example, the position information 334 may be implemented as a buffer array that includes the position, speed, and timer data for one cycle of a sample window. The sample window can be set to any desired size. As one example, the sample window can be set to the period of mechanical rotation of the electric motor 102 or to the period of the position signal 330 from the resolver 104.

In the following example, the size of the sample window is set to the period of the resolver position. Since the buffer size of the stored position information 334 is equal to the number of steps of the resolver, the buffer size (N) is determined per Equation 2:

$$N = \theta_{window}/\theta_{step} \quad \text{(Equation 2)}$$

In Equation 2, $\theta_{window}$ is the angular size of the sample window and $\theta_{step}$ is the angular position step size of the resolver 104. As an example, if the step size $\theta_{step}$ is set to 3° in resolver position and the step size sample window $\theta_{window}$ is set to the period of resolver position, both the number of steps and the buffer size (N) will be equal to one hundred and twenty.

The stored position information 334 is sampled at each step and is stored in association with an index value (i). The index value (i) of the stored position information 334 is derived from the quotient (integer part) of the resolver angle divided by the step size $\theta_{res}/\theta_{step}$.

Figure 4:
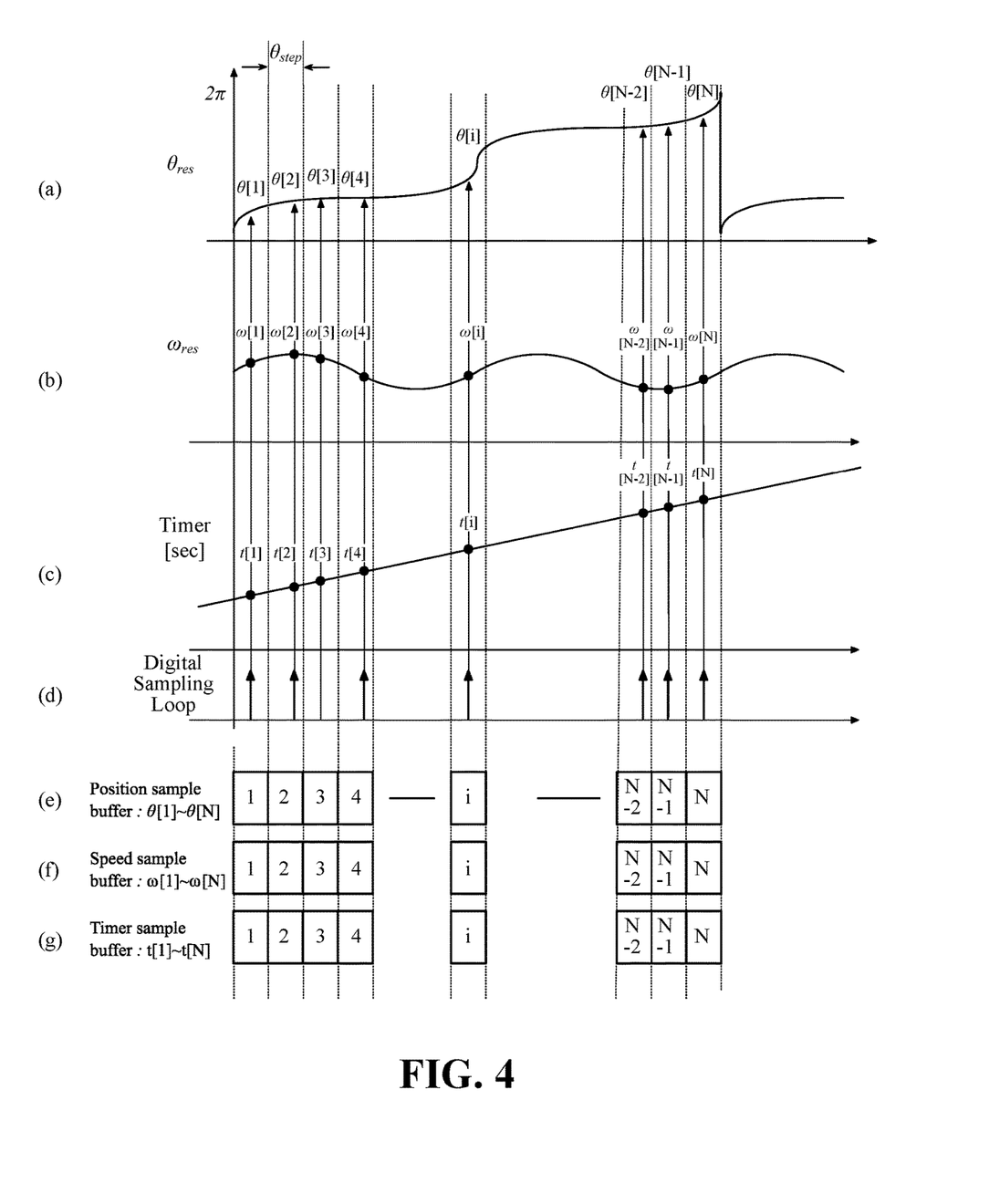
FIG. 4 is an illustration that shows how position, speed, and timer values are sampled.

FIG. 4 is an illustration that shows how the position, speed, and timer values are sampled, in which part (a) shows sampling of the position signal 330 that is output by the position sensor, part (b) shows sampling of the speed calculated from the position signal 330, part (c) shows sampling of the timer value, part (d) shows timing of a digital sampling loop, part (e) shows updating of the position value θ[i] in the stored position information, part (f) shows updating of the speed value ω[i] in the stored position information, and part (g) shows updating of the timer information t[i] in the stored position information.

In a digital implementation, the sampling time may not be synchronized to the angle of the resolver 106, but the position, speed and the timer value may be sampled at the same time once in each sample step and then saved to the corresponding elements (the position value θ[i], the speed value ω[i], and the timer information t[i]) in the buffer arrays. The position and speed are the outputs of resolver 104 and are parts of the position signal 330. As an example, the position value θ[i] and the speed value ω[i] may be incorporated in the position signal as part of conversion of an analog signal from the resolver 104 to a digital signal, such as by a resolver-to-digital converter (RDC), which may be included in the resolver 104 or otherwise provided to process the raw signal generated by the resolver 104. The timer information t[i] may be determined by the position signal corrector 120, for example, from an internal timer that is incorporated in the position signal corrector 120. When the buffer arrays are fully updated from index 0 to index N, the sampled data will be processed to extract the periodic position errors and the periodic speed errors.

Above a certain speed, because of the inertia of the mechanical system (e.g., the rotor 106 of the electric motor 102), it is assumed that the change of real speed is negligible or linear during the sample window, which is the period of mechanical rotation or the period of the resolver position. The position signal corrector 120 can include a single model or multiple models for determining the position correction function 336. In the example described herein, the position signal corrector 120 includes a first model that assumes that the change in speed of the mechanical system is negligible during the sample window, and a second model that assumes a linear change in the speed of the mechanical system during the sample window.

A determination can be made to select the model to be used for determining the position correction function 336 for each sample window. As an example, the determination can be made by comparing a deviation between a single value or averaged group of values at or near the beginning of the sample window with a single value or averaged group of values at or near the end of the sample window. In this example, if the deviation between the values or average values is less than a threshold, it is assumed that the change in speed of the mechanical system is negligible during the sample window, and if the deviation between the values or average values is greater than the threshold, it is assumed that the change in speed of the mechanical system is linear during the sample window.

If the ideal speed is assumed to be constant during the sample window, the average speed $\omega_{avg\_pos\_timer}$ can be calculated from the position and timer data according to Equation 3, the ideal position $\theta_{ideal}[i]$ without periodic error at each sampling time t[i] can be determined as a straight line estimate of position based on average speed by integrating the average speed according to Equation 4, and from the ideal position $\theta_{ideal}[i]$, the periodic position error $\theta_{error}[i]$ can be calculated according to Equation 5.

$$\omega_{avg\_pos\_timer}(\theta_{step}[N]-\theta_{step}[1])/(t[N]-t[1]) \quad \text{(Equation 3)}$$

$$\theta_{ideal}[i]=(t[i]-t[1])*\omega_{avg\_pos\_timer}+\theta[1] \quad \text{(Equation 4)}$$

$$\theta_{error}[i]=\theta[i]-\theta_{ideal}[i] \quad \text{(Equation 5)}$$

The periodic speed error is calculated from the sampled data. In particular, the average speed $\omega_{avg\_speed\_data}$ may be calculated by averaging the speed value ω[i] that was observed for all of the periods (i.e., periods 1-N) during the sampling window according to Equation 6. For the purpose of extracting periodic error, the average speed $\omega_{avg\_speed\_data}$ is utilized as the ideal speed $\omega_{ideal}[i]$ as shown in Equation 7, which reflects an assumption that the speed is constant and based on this assumption, sets the ideal speed equal to the average speed. A speed error ratio $\omega_{error\_ratio}[i]$ of the speed error to the to the ideal speed for a given sampling period is determined according to Equation 8, based on the speed value ω[i] and the ideal speed $\omega_{deal}$.

$$\omega_{avg\_speed\_data} = \sum_{k=1}^{N} \omega[i]/N \quad \text{(Equation 6)}$$

$$\omega_{ideal}[i] = \omega_{avg\_speed\_data}[i] \quad \text{(Equation 7)}$$

$$\omega_{error\_ratio}[i] = (\omega[i] - \omega_{ideal}[i]/\omega[i] \qquad \text{(Equation 8)}$$

As will be explained further herein, when the ideal speed is assumed to be constant during the sample window, the periodic position error $\theta_{error}$ [i] and the speed error ratio $\omega_{error\_ratio}$[i] can be determined according to Equations 3-8, as shown above, and utilized by the position signal corrector 120 to determine the corrected position signal 332.

If the ideal speed is assumed to be changing linearly during the sample window, a speed slope $k_{speed\_slope}$, which represents the rate of change of the ideal speed (i.e., an average acceleration value) during the sample window, can be determined based on the speed value $\omega[i]$ and the timer information t[i] at the beginning and end of the sampling window, according to Equation 9. The ideal speed at each sampling period can be estimated using the speed slope $k_{speed\_slope}$ to model constant acceleration during the sampling period, as shown in Equations 10-11.

$$k_{speed\_slope} = (\omega[N] - \omega[1])/(t[N]-t[1]) \qquad \text{(Equation 9)}$$

$$\omega_{ideal\_1}[i] = k_{speed\_slope}*(t[i]-t[1]) + \omega_{avg\_pos\_timer} - k_{speed\_slope}*0.5*(t[N]-t[1]) \qquad \text{(Equation 10)}$$

$$\theta_{ideal}[i] = 0.5*k_{speed\_slope}*(t[i]-t[1])^2 + [\omega_{avg\_pos\_timer} - k_{speed\_slope}*0.5*(t[N]-t[1])]*(t[i]-t[1]) + \theta[1] \qquad \text{Equation (11)}$$

The periodic position error $\theta_{error}$ [i] is calculated using Equation 5, in the manner described previously. In order to calculate the periodic speed error, the average speed $\omega_{avg\_speed\_data}$ is calculated using Equation 6, and in the manner described previously. An ideal speed $\omega_{ideal\_2}$[i] at each sampling point is then determined based on the average speed $\omega_{avg\_speed\_data}$ and the speed slope $k_{speed\_slope}$ as shown in Equation 12, and a speed error ratio $\omega_{error\_ratio}$[i] for each sampling position is determined as shown in Equation 13.

$$\omega_{ideal\_2}[i] = \omega_{avg\_speed\_data} + k_{speed\_slope}*\{(t[i]-t[1]) - 0.5*(t[N]-t[1])\} \qquad \text{(Equation 12)}$$

$$\omega_{error\_ratio}[i] = (\omega[i] - \omega_{ideal\_2}[i])/\omega_{ideal\_2}[i] \qquad \text{(Equation 13)}$$

As with the constant speed model, and as will be explained further herein, when the ideal speed is assumed to be changing linearly during the sample window, the periodic position error $\theta_{error}$ [i] and the speed error ratio $\theta_{error\_ratio}$[i] can be determined according to Equations 5-6 and 9-13, as shown above, and utilized by the position signal corrector 120 to determine the corrected position signal 332.

The periodic position error $\theta_{error}$ [i] that was determined using either the constant-speed model or linearly-changing speed model may include a DC offset. For example, the DC offset may be attributable to an alignment error. In implementations in which only the harmonic component of the error is to be extracted and compensated for, the DC component of the error can be removed as shown in Equation 15.

$$\theta_{error\_comp}[i] = \theta_{error}[i] - \left(\sum_{k=1}^{N}\theta_{error}[i]/N\right) \qquad \text{(Equation 14)}$$

In some implementations, compensation can be performed to address discontinuities in the extracted periodic position error. In particular, the first and last element of the extracted position error should be the same if the error is periodic. There can, however, be some difference between the first and last element of the extracted position error due to measurement noise or numerical error. If the error values for the first and last element of the extracted position error are significantly different, it can cause the discontinuity in the compensated angle. Compensation can be applied to address such a difference. For example, compensation can be applied if the difference between the first and last element of the extracted position error is greater than a threshold value. In one implementation, the difference is removed by a linear adjustment, as shown in Equation 15.

$$\theta_{error\_comp}[i] = \theta_{error}[i] - \left[\frac{\theta_{error}[N] - \theta_{error}[1]}{t[N] - t[1]}(t(i)-t(1)) - 0.5*(\theta_{error}[N] - \theta_{error}[i])\right] \qquad \text{(Equation 15)}$$

Figure 5:
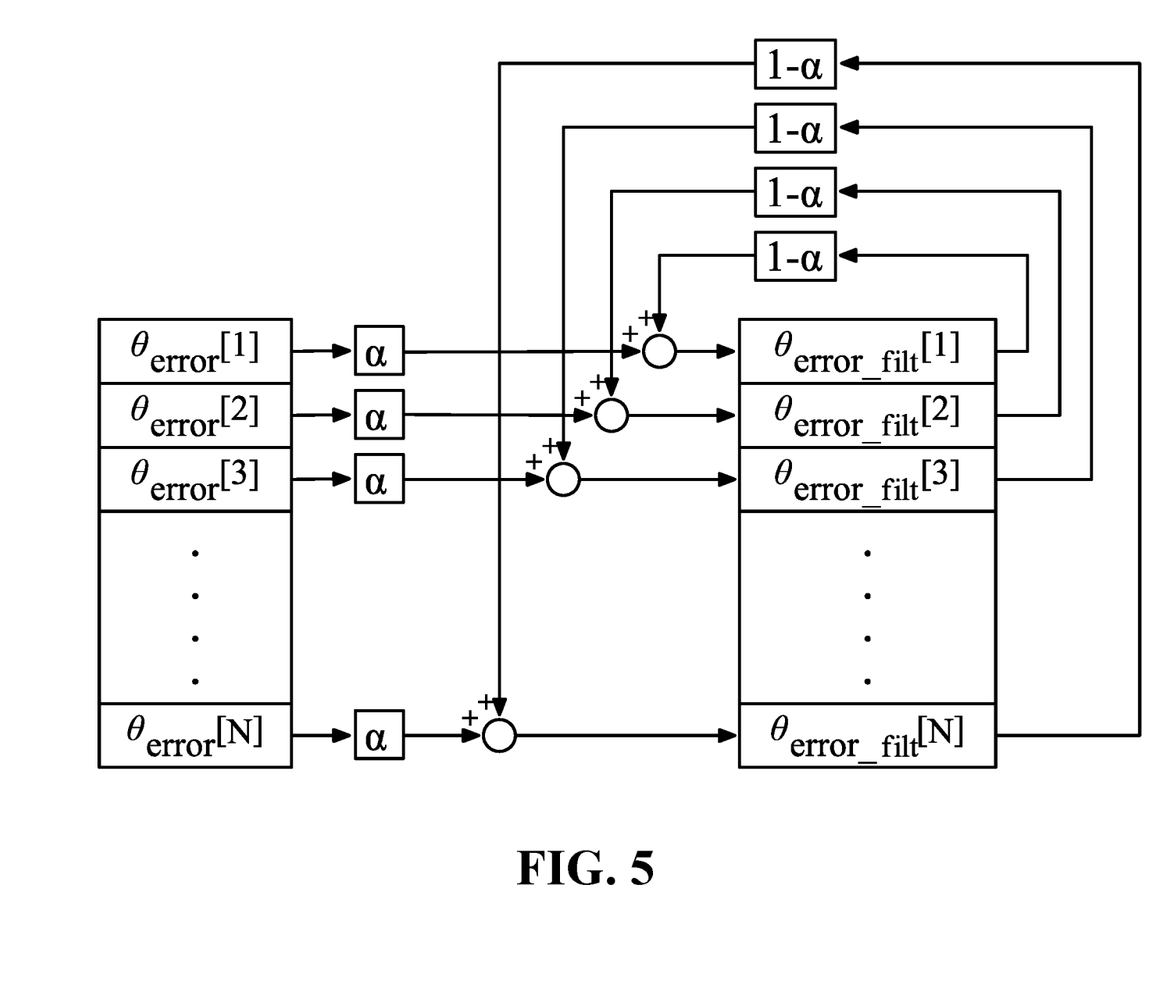
FIG. 5 is an illustration that shows a digital spatial filter applied to periodic position errors.

FIG. 5 is an illustration that shows a digital spatial filter applied to the periodic position errors that are measured during each sampling period and can also be applied to the periodic speed errors to accurately model position and speed errors over time. In particular, the position, speed, and timer values are sampled repeatedly at subsequent sample windows during the normal operation of the system. The periodic position error $\theta_{error}$ or $\theta_{error\_comp}$ and the speed error ratio $\omega_{error\_ratio}$ are also calculated repeatedly corresponding to each of the sampled data sets. Each extracted position error and speed error ratio is filtered to reduce the effect of the noise and to avoid the interaction between the compensation process and the motor control. The filtered data is stored in a filtered position error array $\theta_{error\_filt}$ and a filtered speed error array $\omega_{error\_filt}$. When the periodic position error $\theta_{error}$ or $\theta_{error\_comp}$ and speed error ratio $\omega_{error\_ratio}$ are extracted, each element of the filtered array is updated one by one from index 1 to index N, as shown in Equation 16.

$$\theta_{error\_filt}[i] = \alpha*\theta_{error}[i] + (1-\alpha)*\theta_{error\_filt\_previous}[i] \qquad \text{(Equation 16)}$$

In Equation 16, $\theta_{error\_filt\_previous}$[i] is the previous value of the filtered array and the value $\alpha$ is a constant between 0 to 1, which represents a percentage by which the value of $\theta_{error\_filt\_previous}$[i] is updated based on $\theta_{error}$[i]. The speed error gain $\omega_{error\_ratio}$ can be filtered using the same method and is saved in the filter array $\omega_{error\_ratio\_filt}$.

Figure 6:
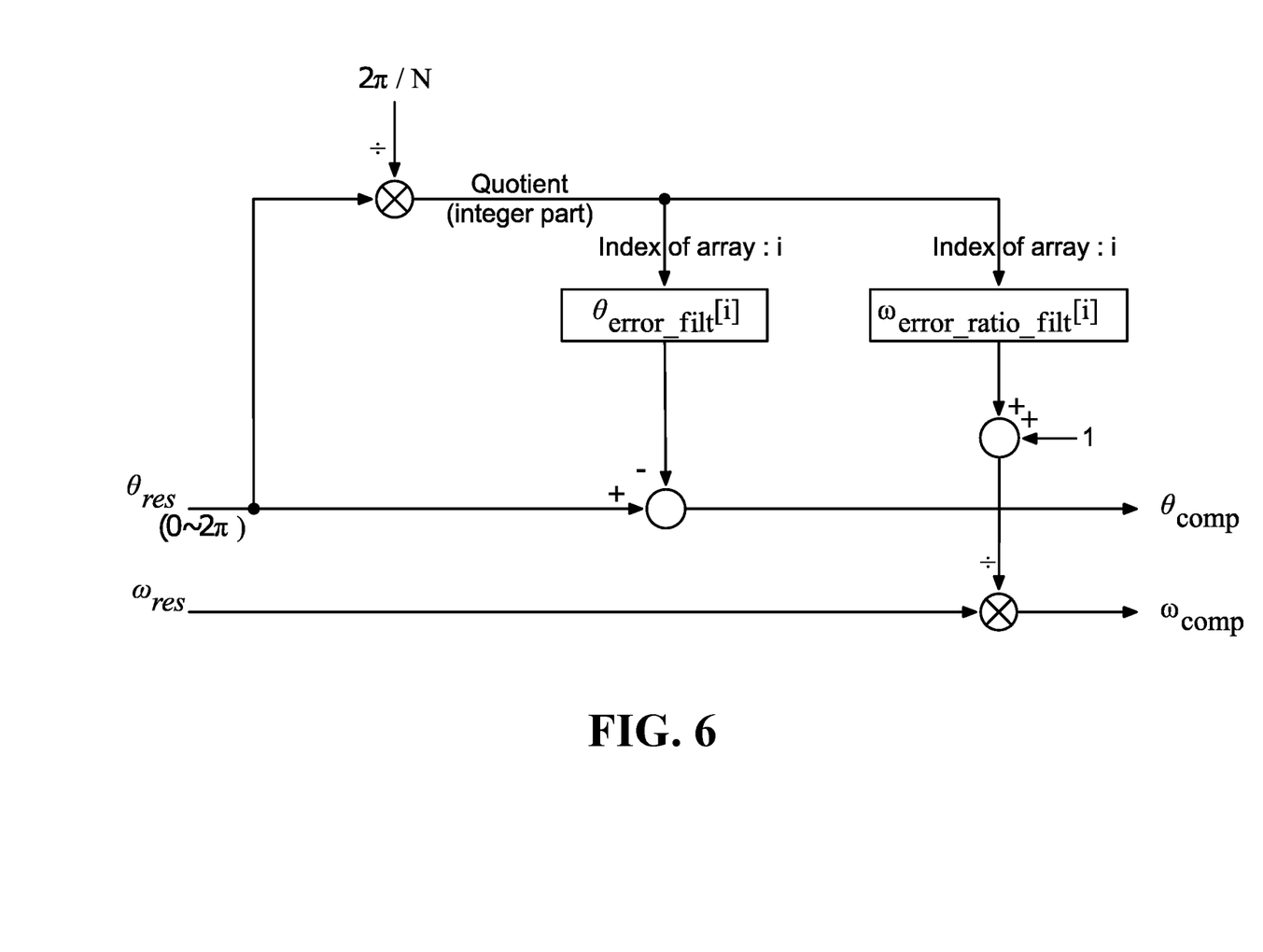
FIG. 6 is a diagram that shows compensation of position and speed using extracted position errors and extracted speed errors.

FIG. 6 is a diagram that shows compensation of position and speed using extracted position errors and extracted speed errors. From the measured position output $\theta_{res}$ of the resolver 104, the corresponding index of the filter array is calculated from the quotient (i.e., the integer part) of the position output divided by the step size (i.e., 2*π/N). Using the index of the filter array that was determined from the measured position output $\theta_{res}$, the corresponding position error and speed error ratio elements are obtained from the filtered position error array $\theta_{error\_filt}$ and the filtered speed error ratio array $\omega_{error\_ratio\_filt}$. The compensated position $\theta_{comp}$ can be calculated by subtracting the periodic position error $\theta_{error\_filt}$[i] from the position output of the position sensor $\theta_{res}$ according to Equation 17. The compensated speed $\omega_{comp}$ can be calculated from the speed of the position sensor $\omega_{res}$ according to Equation 18.

$$\theta_{comp} = \theta_{res} - \theta_{error\_filt}[i] \qquad \text{(Equation 17)}$$

$$\omega_{comp} = \omega_{res}/(1+\omega_{error\_ratio\_filt}[i]) \qquad \text{(Equation 18)}$$

Figure 7:
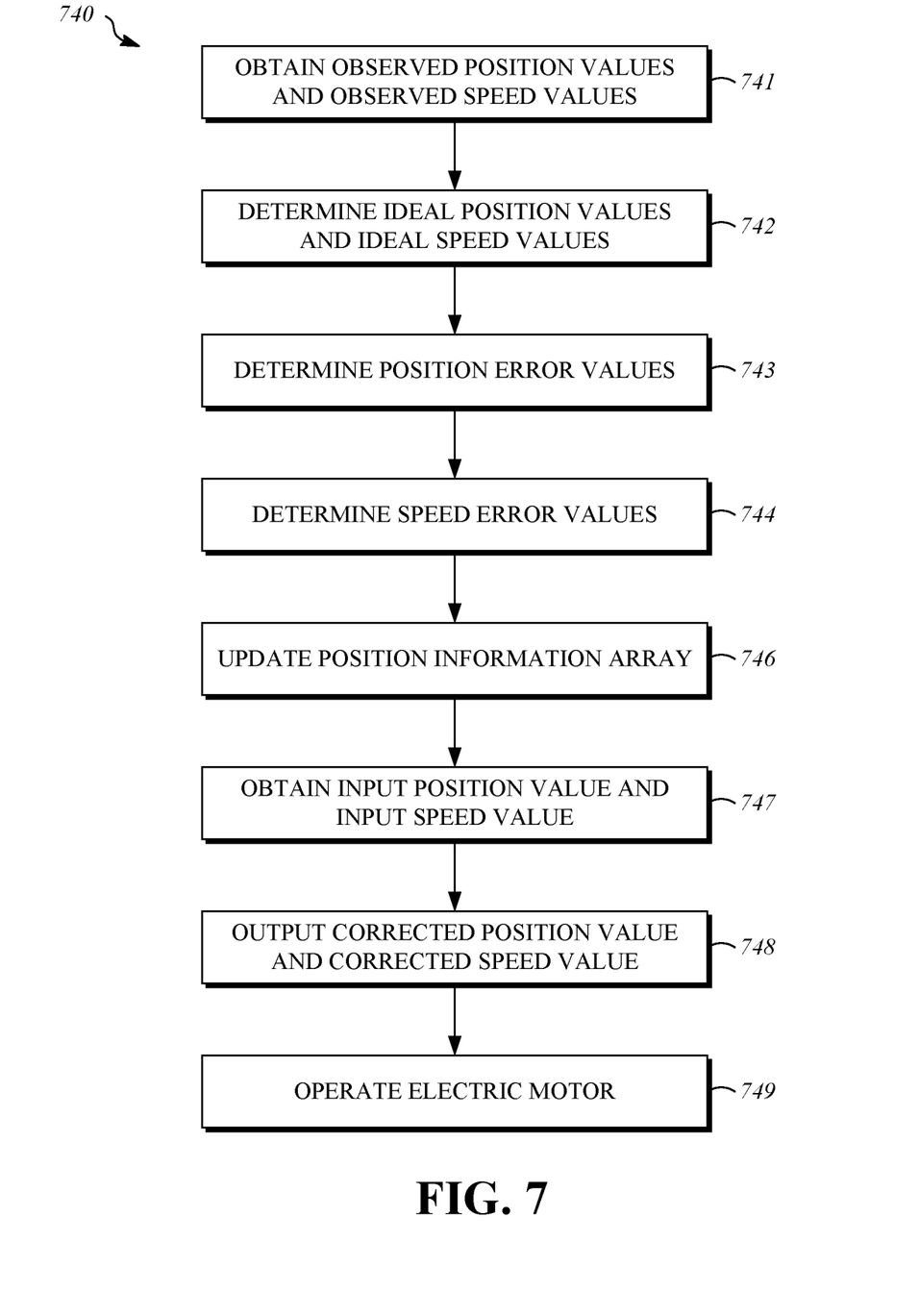
FIG. 7 is a flowchart that shows a process for correcting speed and position errors.

FIG. 7 is a flowchart that shows a process 740 for correcting speed and position errors. The process can be performed by a computing device, such as the position signal corrector 120, using information received from a position sensor, such as the resolver 104. The output of the process 740 may be, for example, corrected position and speed values, which represent the current position and speed of an electric motor, such as the electric motor 102.

In operation 741, observed position values and observed speed values are obtained from a position sensor for time points during a sampling window. The position sensor may be, for example, the resolver 104. The sampling window can be any desired time period, such as one resolver period of the resolver 104 or one rotation period of the electric motor 102.

In operation 742, ideal position values and ideal speed values are determined for each of the time points. As one example, operation 742 can be performed by modelling the ideal position values and the ideal speed values based on an assumed constant speed for the electric motor 102 during the sampling window. As another example operation 742 can be performed by modelling the ideal position values and the ideal speed values based on an assumed linearly changing speed (i.e., constant acceleration or deceleration) for the electric motor 102 during the sampling window. Operation 742 may include selecting one of a constant speed model or a linearly changing speed model based on the observed speed values, for example based on variation among the observed speed values during the sampling window, such as by assuming constant speed if the variation is less than a threshold amount, and by assuming linearly changing speed if the variation is greater than a threshold amount.

Operation 743 includes determining position error values for each of the time points based on the observed position values and the ideal position values. The position error values can each be expressed, for example, as a difference between the observed position value and the ideal position value.

Operation 744 includes determining speed error values for each of the time points based on the observed speed values and the ideal speed values. The speed error values can each be expressed, for example, as a ratio of the difference between the observed and ideal speed values relative to the ideal speed value.

Operation 745 includes updating a position information array using the position error values and the speed error values. As an example, the position information array may store position correction information and speed correction information according to index values. The index values may correspond, at least approximately, to positions of the electric motor 102. Updating the position information array using the position error values and the speed error values in operation 745 may be performed by filtering previous position error values and previous speed error values using the position error values and the speed error values from operation 743 and operation 744.

In operation 746, an input position value and an input speed value are obtained from the observed position values and the observed speed values. In operation 747, a current index value is determined based on the input position value from operation 746. As described with respect to FIG. 6, the current index value is determined based on the input position value and is utilized to select correction values from the position information array. In particular, operation 748 includes outputting a corrected position value and a corrected speed value using position correction information and speed correction information that are selected from the position information array using the selected index value. For example, the input position value can be corrected by adding a value from the position correction information and the input speed value can by corrected by multiplication with a ratio from the speed correction information.

In operation 749, the electric motor 104 is operated using the corrected position values and the corrected speed values that were determined and output in operation 748.

In the above description of the process 740, operations 741-749 are described in a sequential order for ease of understanding. It should be understood, however, that the sequence of operations could be changed, need not be in the order shown, and need not be sequential. As one example, operations relating to determining and updating the magnitude of speed and position errors (i.e., operations 741-746) could be performed in parallel with operations relating to correcting the observed position and speed values for use in controlling the electric motor 102 (i.e., operations 747-749).

Figure 8:
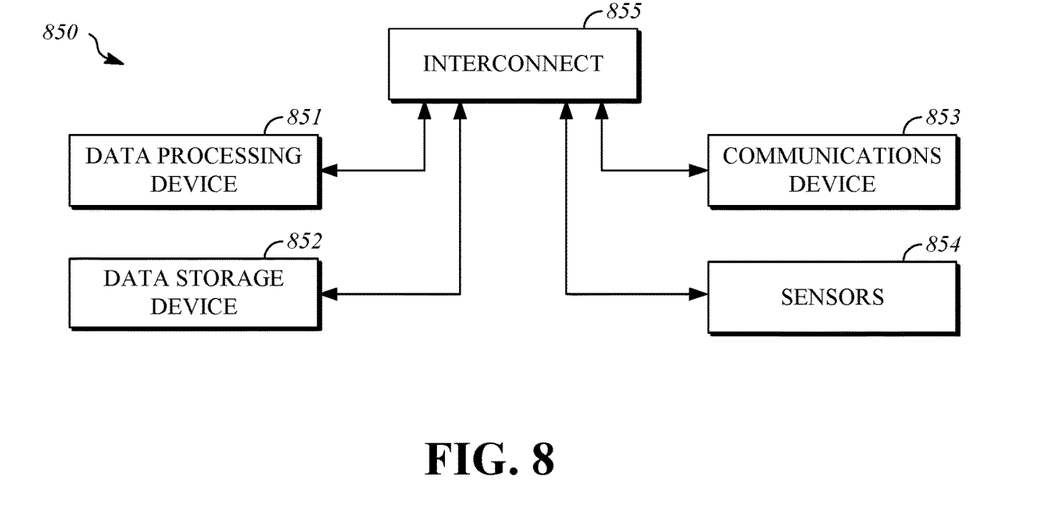
FIG. 8 is a block diagram that shows an example hardware configuration that can be utilized to implement a computing device.

FIG. 8 is a block diagram that shows an example hardware configuration 850 that can be utilized to implement a computing device, such as the controller 118 and/or the position signal corrector 120. The hardware configuration 850 includes a data processing device 851, a data storage device 852, a communications device 853, a sensor system 854, and an interconnect 855. The data processing device 851 is operable to execute instructions that have been stored in the data storage device 852. In some implementations, the data processing device 851 is a processor with random access memory for temporarily storing instructions read from the data storage device 852 while the instructions are being executed.

The data storage device 852 may be a non-volatile information storage device such as a hard drive or flash memory. In addition to storing program instructions that are executable by the data processing device 851, the data storage device 852 can be used to store additional information. For example, the data storage device 852 can store information that is collected or obtained from various sources.

The communications device 853 allows input and output of information to other systems, such as through a wireless communications link. Examples of wireless communications technologies that can be utilized include cellular data technologies and IEEE 802.11 based communications technologies.

The sensor system 854 is operable to obtain, store, and/or transmit information (e.g., metadata) that is associated with the electric motor 102. As examples, information obtained by the sensor system 854 may include the position signal (e.g., from the resolver 104), a current signal, and a voltage signal.

The interconnect 855 facilitates communication between the various components. As an example, the interconnect 855 may be a system bus or may include multiple system buses.

What is claimed is:

1. An apparatus, comprising:
a position sensor that outputs observed position values for time points during a sampling window, wherein observed speed values are determined based on the observed position values;
an electric motor that is connected to the position sensor and is operated according to corrected position values and corrected speed values that are determined based on the observed position values, the observed speed values, and stored position information; and
a position corrector that is operable to:
determine ideal speed values for each of the time points based on the observed speed values and according to a speed model that describes a change in a speed of the electric motor during the sampling window;

determine ideal position values for each of the time points based on the ideal speed values, determine position error values for each of the time points based on the observed position values and the ideal position values, determine speed error values for each of the time points based on the observed speed values and the ideal speed values, and update the stored position information using the position error values and the speed error values.

2. The apparatus of claim 1, wherein the stored position information is in a position information array that includes position correction information and speed correction information.

3. The apparatus of claim 2, wherein updating the position information array using the position error values and the speed error values is performed by filtering previous position error values and previous speed error values.

4. The apparatus of claim 2, wherein the position correction information and the speed correction information are stored in the position information array according to index values, and the position correction information and the speed correction information are accessed according to the index values.

5. The apparatus of claim 1, wherein the speed model assumes that the speed of the electric motor is a constant speed during the sampling window.

6. The apparatus of claim 1, wherein a constant speed model is selected as the speed model if a variation among the observed speed values is less than a threshold value and a linearly changing speed model is selected as the speed model if the variation among the observed speed values is greater than a threshold value.

7. The apparatus of claim 1, wherein the position corrector determines the position error values for each of the time points as a difference between the observed position values and the ideal position values.

8. The apparatus of claim 1, wherein the position corrector determines the speed error values for each of the time points as a ratio of speed difference values relative to the ideal speed values, wherein each of the speed difference values is differences between one of the observed speed values and a respective one of the ideal speed values.

9. The apparatus of claim 1, wherein the speed model assumes that a speed of the electric motor is a linearly changing speed during the sampling window.

10. An apparatus, comprising:
a position sensor that outputs observed position values for time points during a sampling window, wherein observed speed values are determined based on the observed position values;
an electric motor that is connected to the position sensor; and
a position corrector that is operable to:
determine ideal position values and ideal speed values for each of the time points, wherein the ideal position values and the ideal speed values for each of the time points are estimated by assuming a linearly changing speed during the sampling window,
determine position error values for each of the time points based on the observed position values and the ideal position values,
determine speed error values for each of the time points based on the observed speed values and the ideal speed values,
update stored position information using the position error values and the speed error values, and
operate the electric motor using corrected position values and corrected speed values that are determined from the observed position values, the observed speed values, and the stored position information.

11. A method, comprising:
obtaining observed position values from a position sensor for time points during a sampling window, wherein observed speed values are determined based on the observed position values;
determining ideal speed values for each of the time points based on the observed speed values and according to a speed model that describes a change in a speed of the electric motor during the sampling window;
determining ideal position values for each of the time points based on the ideal speed values;
determining position error values for each of the time points based on the observed position values and the ideal position values;
determining speed error values for each of the time points based on the observed speed values and the ideal speed values;
updating stored position information using the position error values and the speed error values; and
operating an electric motor according to corrected position values and corrected speed values that are determined based on the observed position values, the observed speed values, and the stored position information.

12. The method of claim 11, wherein the stored position information is in a position information array, and the position information array includes position correction information and speed correction information.

13. The method of claim 12, wherein the position correction information and the speed correction information are stored in the position information array according to index values, and the position correction information and the speed correction information are accessed according to the index values.

14. The method of claim 11, wherein the speed model assumes that a speed of the electric motor is a constant speed during the sampling window.

15. The method of claim 11, wherein the speed model assumes that a speed of the electric motor is a linearly changing speed during the sampling window.

16. A system, comprising:
a computing device having computer-executable instructions that, when executed, cause the computing device to:
obtain observed position values from a position sensor for time points during a sampling window, wherein observed speed values are determined based on the observed position values,
determine ideal speed values for each of the time points based on the observed speed values and according to a speed model that describes a change in a speed of the electric motor during the sampling window;
determine ideal position values for each of the time points based on the ideal speed values,
determine position error values for each of the time points based on the observed position values and the ideal position values,
determine speed error values for each of the time points based on the observed speed values and the ideal speed values,
update stored position information using the position error values and the speed error values, and operate an electric motor according to corrected position values and corrected speed values that are determined from the observed position values, the observed speed values, and the stored position information.

17. The system of claim 16, wherein the stored position information is in a position information array, and the position information array includes position correction information and speed correction information.

18. The system of claim 17, wherein the position correction information and the speed correction information are stored in the position information array according to index values, and the position correction information and the speed correction information are accessed according to the index values.

19. The system of claim 16, wherein the speed model assumes that a speed of the electric motor is a constant speed during the sampling window.

20. The system of claim 16, wherein the speed model assumes that a speed of the electric motor is a linearly changing speed during the sampling window.

* * * * *